BEST AVAILABLE COPY

United States Patent [19]

Smith

[11] E Patent Number: Re. 32,607

[45] Reissued Date of Patent: Feb. 23, 1988

[54] COMPACT ATTIC MOUNTED SOLAR HEATING PACK ASSEMBLY

[75] Inventor: David C. Smith, Proctorville, Ohio

[73] Assignees: Robert Weeks; J. A. Porter; Kenneth Hughes; R. H. Maynard; Jack Herald, all of W. Va.

[21] Appl. No.: 814,449

[22] Filed: Dec. 30, 1985

Related U.S. Patent Documents

Reissue of:

[64] Patent No.: 4,502,467
Issued: Mar. 5, 1985
Appl. No.: 622,594
Filed: Jun. 20, 1984

[51] Int. Cl.[4] ..... E04D 13/18

[52] U.S. Cl. ..... 126/429; 126/422; 236/91 A

[58] Field of Search ..... 126/429, 430, 431, 428, 126/422, 417; 236/91 A; 98/31, 103; 165/48.5, DIG. 2; 62/235.1

[56] References Cited

U.S. PATENT DOCUMENTS

| | | | |
|---|---|---|---|
| 4,029,258 | 6/1977 | Groth | 126/430 |
| 4,049,195 | 9/1977 | Rugenstein | 126/422 |
| 4,051,999 | 10/1977 | Granger et al. | 126/429 |
| 4,103,825 | 8/1978 | Zorning | 126/429 |
| 4,125,222 | 11/1978 | Briscoe | 126/429 |
| 4,201,188 | 5/1980 | Cummings | 126/429 |
| 4,244,519 | 1/1981 | Zornig et al. | 126/428 |
| 4,254,822 | 3/1981 | Geier | 126/428 |
| 4,262,656 | 4/1981 | Esposito | 126/428 |
| 4,279,082 | 7/1981 | Commander | 126/429 |
| 4,378,787 | 4/1983 | Fleischmann | 126/435 |
| 4,404,959 | 9/1983 | Mondragon | 126/429 |
| 4,418,685 | 12/1983 | Frazier | 126/428 |
| 4,437,511 | 3/1984 | Sheridan | 126/429 |
| 4,497,311 | 2/1985 | Brandenburg | 126/429 |

*Primary Examiner*—James C. Yeung
*Attorney, Agent, or Firm*—Sughrue, Mion, Zinn, Macpeak, and Seas

[57] ABSTRACT

A compact attic mounted solar heating pack assembly includes an enclosed sheet metal plenum fixedly hung by straps from the attic rafters at the apex of north and south facing roofing sections. An electric powered blower fixed to the plenum has an air inlet open to the attic interior below the south facing roof section. An air outlet of the blower opens directly to the plenum interior. A plurality of flexible ducts are coupled to respective air outlets within the plenum at one end with their opposite ends terminating in diffusers mountable within holes formed within the underlying ceiling for delivering air from the plenum chamber directly to the building interior below the attic floor. A first normally open cooling thermostat is mounted within the attic at the apex, beneath the south facing roof section. A plastic heat barrier is hung from the ridge pole and extends well elbow the plenum chamber to trap heated air within the section of the attic beneath the south facing wall. A second heating thermostat is mounted within the building interior below the ceiling and preferably on an interior partition wall and is series connected with the blower motor and the first attic mounted thermostat and connectable to a source of electrical current. The normally open thermostat closes when room heat is needed and the temperature in the attic is above 70 degrees to provide an effective independent supplementary heating unit for the building.

10 Claims, 4 Drawing Figures

BEST AVAILABLE COPY
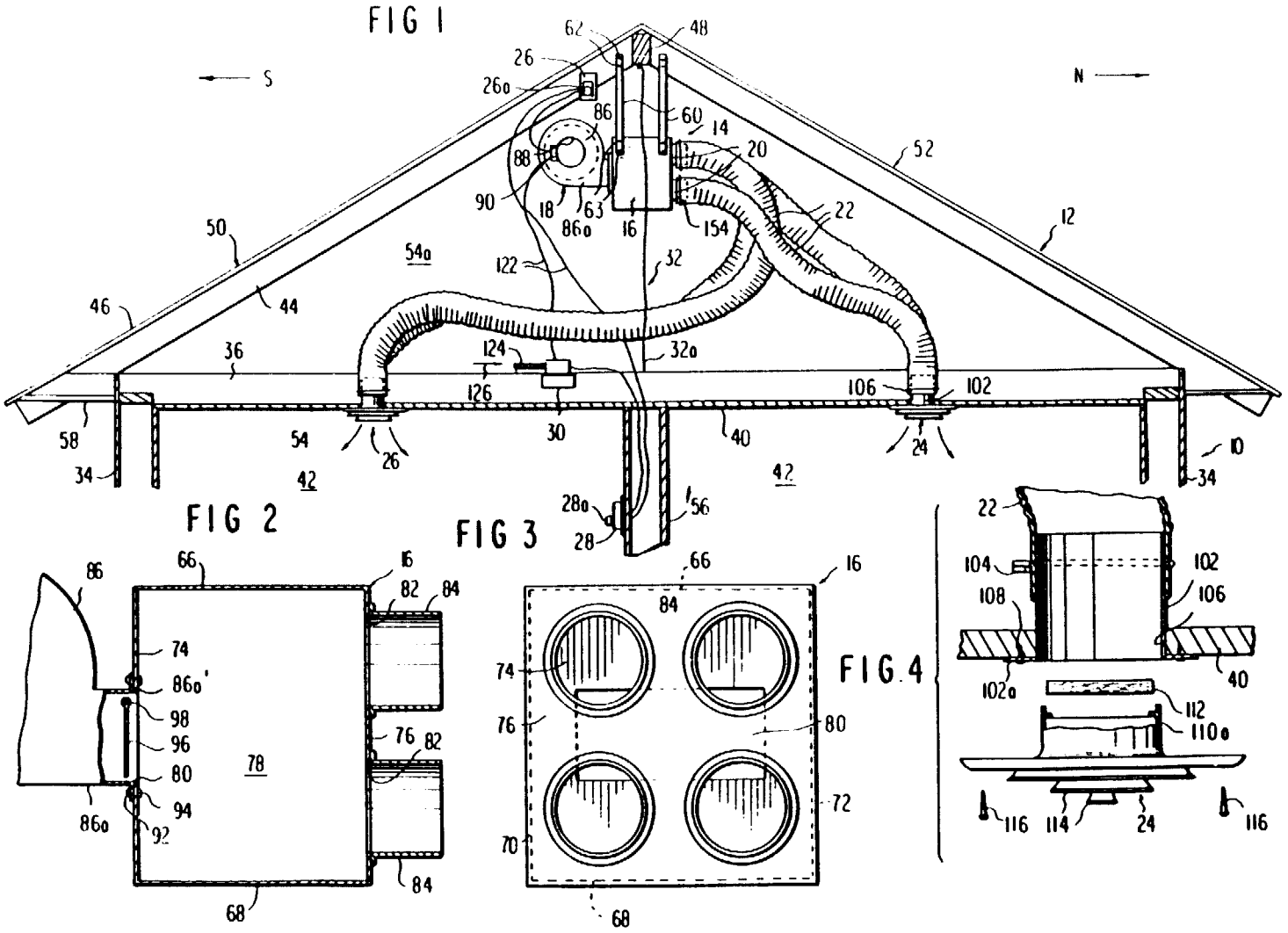

BEST AVAILABLE COPY

COMPACT ATTIC MOUNTED SOLAR HEATING PACK ASSEMBLY

Matter enclosed in heavy brackets [ ] appears in the original patent but forms no part of this reissue specification; matter printed in italics indicates the additions made by reissue.

FIELD OF THE INVENTION

This invention relates to passive solar heating systems, and more particularly, to a low cost, compact solar heating pack assembly which may be mounted within existing dwellings and which functions to provide supplementary heating on bright sunny days, during the winter months.

BACKGROUND OF THE INVENTION

Passive solar heating systems have come into vogue for utilizing heat concentrated within a given area as a result of solar radiation for providing either primary or supplemental heating to a building interior during bright sunny days. The heat energy is absorbed by the building interior and transferred to moving air either by way of a thermal siphonic loop or by way of a duct system employing an electrical motor powered blower for circulating the air between the space in which the solar energy is absorbed and the various rooms of the building to be heated.

U.S. Pat. No. 4,084,573 discloses one type of prior solar heater in which a pyramidal solar heater is formed of translucent heat absorbing plastic material or the like. A spaced, smaller pyramidal structure interiorly of the first forms with the outer pyramidal structure dual air flow paths, whereby heated air may be moved out of the pyramidal solar heater downwardly into a room or enclosure underlying the same. Such structures are expensive, require modification of existing buildings or the incorporation of expensive additions within new building structures in order to achieve such circulation loop and to create a space wherein the sunlight may be absorbed and concentrated prior to transmission into the occupied rooms of the building.

U.S. Pat. No. 4,103,825 is representative of a solar heated building in which a solar window is provided within the south facing roof section and wherein attic interior air heated by the solar radiation is ducted to an occupied room by ducts passing through the dwelling ceiling. A horizontal wall divides the attic interior into an upper plenum chamber and a lower plenum chamber. Air is heated in the upper plenum chamber by solar radiation, conveyed to the rooms of the dwelling, while cooler air is returned to the upper plenum chamber from the rooms for reheating purposes. During hot weather, heated air is allowed to escape from the top of the upper plenum which, in turn, draws warm air out of the lower plenum into the upper plenum, thereby allowing cooler outside air to be drawn into the lower plenum. As such, the south facing roof requires modification by the presence of the translucent or transparent solar window, the interior of the attic is separated into two plenum chambers, the blower or forced air means is within the duct remote from the attic, and multiple separate ducts feeding the separated upper and lower plenum chambers which complicates the system.

It is, therefore, a primary object of the present invention to provide a compact, unitary passive solar heating pack assembly for mounting within an existing building attic for ready suspension at the apex thereof, wherein the building needs no modification, and wherein all of the components including the control elements, the hot air ducts and diffusers for mounting within the occupied room ceilings and opening to the room interiors are integrated to the pack assembly.

SUMMARY OF THE INVENTION

The present invention is directed to a compact atic solar heating pack assembly for suspension mounting within an existing conventional building at the apex of the building attic, which building has diagonally opposed south and north facing roof sections overlying a horizontal attic floor and forming the ceiling of the occupied rooms of the building. The attic is provided with vented eaves which open to the attic interior for supplying fresh air thereto. The pack assembly comprises a closed sheet metal plenum. Straps fixed to the plenum mount the plenum to the attic ridge pole just below the apex. A blower fixedly mounted to the plenum has an air inlet open to the attic enclosure and an outlet open directly to the interior chamber of the plenum. The blower includes an electric motor for operating the same. A plurality of air outlets within the plenum open to flexible ducts coupled at one end to the plenum chamber outlets, respectively, with the ducts terminating at their other ends in air diffusers, which diffusers are mountable within the attic floor opening through the building ceiling for delivering air from the plenum chamber to the occupied rooms below the attic. A first normally open cooling thermostat is adapted for mounting within the attic enclosure adjacent to the apex and below the south facing roof section. It is responsive to a relatively large increase in temperature of the air within the attic near the apex as a result of solar radiation impingement on the south facing roof section. A second normally open heating thermostat is adapted for mounting within an occupied room of the building, below the ceiling, and is responsive to room temperature. Cable means electrically connect the blower motor and the thermostats in series and are adapted for connection to an electrical power source so as to energize the blower motor through the thermostats. A blower outlet damper is provided at the plenum chamber inlet responsive to blower operation for permitting heated air adjacent to the apex of the attic to pass through the plenum, and into the building room interior below the ceiling through the attic floor, but prevent escape of air from the occupied rooms to the attic.

Preferably, a flexible heat barrier sheet is suspended from the ridge pole to extend across the attic, with the blower opening to the side of the flexible sheet facing the south facing roof section. The flexible sheet extends downwardly below the plenum to form a solar air heated space between the heat barrier flexible sheet and the south facing roof to concentrate the solar energy. The plenum may be suspended by straps extending downwardly from the ridge pole or the roof rafters. Preferably, the second heating thermostat is mounted to an interior partition wall of the building within an occupied room at some distance below the ceiling.

BRIEF DESCRIPTION OF THE DRAWINGS

FIG. 1 is a vertical sectional view of a dwelling type building incorporating the compact attic solar heating pack assembly and forming a preferred embodiment of the present invention.

BEST AVAILABLE COPY

FIG. 2 is an enlarged sectional view of the plenum forming a primary component of the pack assembly of FIG. 1.

FIG. 3 is an end view of the plenum of FIG. 2.

FIG. 4 is an exploded view, partially in section, of one diffuser for mounting within the attic floor and opening from the building ceiling into an occupied room of the building structure housing the attic solar heating pack assembly of which the diffuser forms one component.

DESCRIPTION OF THE PREFERRED EMBODIMENT

Referring to the drawings, the compact attic mounted solar heating pack assembly indicated generally at 14 has application to and is shown in combination with a building structure indicated generally at 10 which may be a dwelling, and specifically the pack assembly 14 is mounted within the attic indicated generally at 12. The essential components of pack assembly 14; are a sheet metal plenum 16, a scroll type electric motor driven blower indicated generally at 18, a plurality of flexible ducts indicated generally at 22 and mounted to plenum 16 via outlet thimbles 20, diffusers indicated generally at 24 coupled to the opposite ends of the flexible ducts 22 and mounted within the ceiling 40 of the building structure 10, a cooling thermostat 26, heating thermostat 28, junction box 30 connected to a source of power, and a flexible heat barrier sheet 32.

The invention resides in pack assembly 14 as well as the combination of the pack assembly and building structure 10. In that respect, building structure 10 includes vertical outer walls as at 34 across which span a number of attic or ceiling joists 36 which span across the upper ends of walls 34. Ceiling 40 underlying joists 36 separates the attic 12 from the occupied portion of the building, that is, the interior room or space 42. A number of roof rafters 44 incline upwardly from walls 34 and bear roofing at 46. The roof rafters 44 joint at their upper ends by being fixedly mounted to a horizontally extending ridge pole 48. The ridge pole 48 extends east and west so that south facing roof section, indicated generally at 50, extends to the left, while north facing roof section, indicated generally at 52, extends to the right of ridge pole 48. Ceiling 40 and roof sections 50 and 52 form an attic space indicated generally at 54 separated from the interior, occupied room space 42. As may be appreciated, a number of vertical partition walls as at 56 separate the building interior into separate rooms.

As in conventional construction, the roof sections 50 and 52 extend beyond the building sidewalls as at 34, such that a number of eave openings or ventilators 58 permit air to enter the interior 54 of the attic at the lower ends of the roof, to each side thereof. If as in conventional buildings additional openings or ridge vents (not shown) are provided at opposite ends of the building just beneath the ridge pole 48 to permit the air to exit in the summer, such ridge vent openings must be closed off during the winter months to permit the pack assembly to perform its function in providing auxiliary or supplemental heating to the building interior. Under such circumstances, it is important that the openings 58 at the eaves be maintained so as to provide the source of air for circulation to the building interior after heating within the attic space 54. Such ridge vents or ventilators may be sealed off by placing thermal insulation over such openings. All eave ventilators 58 need to be left open at all times.

The solar heating pack assembly 14 comprises principally the solar attic heater blower 18 and plenum 16, and this unit should be located as close to the ridge pole 48 as possible and centered under the ridge pole 48. The pack assembly 14 is shown as being supported by perforated iron hangers or straps 60 which may be nailed as at 62 at their upper ends to the roof rafters 42 or alternatively directly to the ridge pole 48. The lower ends may be attached by rivets, bolts or the like 63 to plenum 16.

Plenum 16 comprises, in the form illustrated, a sheet metal box including upper wall 66, lower wall 68, laterally opposed left and right sidewalls 70 and 72 and end walls 74 and 76, respectively. The edges may be welded or soldered together to form an essentially closed hollow cubic structure with the interior forming a plenum chamber 78. A rectangular opening 80 is formed within left end wall 74, while four circular holes 82 are formed within the right end wall 76, two at the top and two at the bottom. Welded or otherwise fixed to end wall 76 are four flanged cylindrical thimbles 84 which function to mount the air inlet ends of the flexible ducts 22. To the opposite side, there is directly mounted the scroll housing 86 of blower 18, one side of which is provided with a central, axial air inlet hole as at 88, forming the air intake to the blower 18. An electrical motor 90, for rotating the blower impeller (not shown), is mounted directly to the scroll housing 86. The scroll housing 86 terminates in a tangential projecting portion 86a whose flanged end 86a' is directly mounted to the left end wall 74 of the plenum chamber 16 at opening 80 by way of a series of mounting screws 92 and nuts 94.

Within the tangential outlet duct 86a of the blower, there is suspended a pivotable draft damper 96 which is hingedly mounted by a transverse pin 98 such that the draft damper 96, absent blower operation, extends vertically downwardly from the hinge pin 98 blocking off the flow of air from the plenum chamber 78 in the direction of the scroll air inlet hole 88. During blower operation, the air entering the plenum chamber 78 discharges through the four thimbles 84 and flows through the flexible ducts 22. In that respect, each of the four flexible ducts 22 are connected to the thimbles 84 via a cable type tie bands 104. Tie bands as at 104 are also employed at the opposite end of the ducts 22 for coupling those ends of the ducts to other thimbles as at 102 which thimbles 102 extend upwardly from the ceiling, passing through circular holes 106 provided within the ceiling 40. The cable tie bands 104, or equivalent hose clamps, function to provide an air tight seal between the ends of the flexible ducts 22 and thimbles 100, 102, respectively.

Thimbles 102 include flanged ends 102a which extend radially outwardly of the ceiling hole 106 at the bottom of the thimbles. By way of nails or other fasteners 108 the thimbles 102 are physically mounted to the ceiling 40. The interior of the thimbles 102 receive the upwardly projecting cylindrical portions 110a of diffusers 24. Additionally, removable disc-like filter cartridges 112 mount within the cylindrical portions 110a of the diffusers 24 so as to filter any of the air entering the interior 42 of the building structure rooms to be heated. The diffuser 24 is conventional, and comprises a plurality of radially spaced, annular outwardly flared, nested air deflectors 114 which tend to spread the air flow into the room interior; as indicated by the arrows, FIG. 1, as the air escapes from between the diffuser deflectors at the ends of each of the four flexible ducts 22. A plurality

BEST AVAILABLE COPY of nails or screws 116 permit the diffuser 24 to be detachably mounted to ceiling 40 with the cylindrical portion 110a projecting internally of the thimble 102.

An important element of the attic solar heating pack assembly 14 of the present invention is the thin flexible, plastic heat barrier sheet 32. This sheet 32, which may be of polyethylene or the like, is preferably of a vertical height such that it extends from the ridge pole 48, to which it may be mounted by being tacked thereto along its upper edge by tacks 120 or staples or the like. Its lower edge 32a may lie several inches above the attic rafters 36 or attic floor (not shown), if such floor is mounted directly to the upper edge of rafters 36. As such, the thin flexible plastic sheet heat barrier 32 separates the attic space 54 into a heat concentration area 54a to the left of the sheet 32 and beneath the south facing roof section 50 from the attic space 54b to the right of that flexible sheet 32, which is normally considerably cooler, since the angle of inclination of the north facing roof section 52 is such as to prevent the absorption of significant amount of the thernal energy from the sun during the winter months.

As shown, the sheet passes through the center of the plenum 16, and the sheet 32 may be purposely cut out so as to receive the plenum 16 without significant air passage about the periphery of the hole within sheet 32 through which the cubic form plenum passes. Further, as may be appreciated, two of the diffusers and flexible ducts 22 pass to the left of the flexible sheet and open up to the building room interior 42 to the left of the vertical partition wall 58, while the other two open up to the right of that partition wall. The flexible ducts leading to diffusers 24 to the right are shown as penetrating the plastic heat barrier sheet 32. However, lower end 32a of the heat barrier sheet 32 may terminate just above those duct members. Further, the flexible ducts 22 may lie on top of the attic joists 36 to pass beneath the lower end 32a of the thin flexible sheet 32.

Further important components of the atic solar heating pack assembly 14 comprise the two thermostats 26 and 28 for controlling the operation of the scroll type blower 18 and the junction box 30 as well as the electrical wiring indicated generally at 122, all components of the electrical control system for automatic operation of the supplementary heating system. In that respect, cooling thermostat 26 is shown as being mounted to one of the roof rafters 44 to the left of the heat barrier flexible plastic sheet 32 and to the same side thereof as the scroll type blower air inlet hole 88. The second, heating thermostat 28 is shown as being mounted to partition wall 56. The electrical wires 122 connect the heating thermostat 28, the electric drive motor 90 for the scroll type blower 18 and the cooling thermostat 26 in series through junction box 30 from which cable 124 extends for connection to a source of electrical power as indicated generally by arrow 126.

This completes the components of the attic solar heating pack assembly 14. For the electrical control system, a separate fuse and grounded circuit is recommended. Both thermostats 26 and 28 and blower motor 90 may operate on 115 volts AC, with the components wired in series as shown. With cable 124 connected to a power source such as 115 volt AC electrical source as indicated by arrow 126, control knob 28a of the heating thermostat 28 is set, as is control knob 26a of cooling thermostat 26, such that the electrical power comes to the heating thermostat first whose contacts close when the room temperature drops below a preset value as, for instance, 65 degrees. The normally open contacts of the heating thermostat 28 close completing a circuit through the motor 90 from the source of electrical power via junction box 30 to cooling thermostat 26. Its contacts remain open until the temperature reaches a predetermined value in space 54a to the left of the plastic heat barrier flexible sheet 32 at the apex of the attic 12. When the temperature reaches, for instance, 70 degrees F. heat concentration in the attic space 59a, the normally open contacts of the cooling thermostat 26 close, causing the blower motor to start operation. As it starts, air at 70 degrees enters the opening 88 within the side of the blower scroll 86 and flows into plenum chamber 78 by deflecting the pivotable draft damper 96 to the right, FIG. 2. Air then flows through all four flexible ducts 22 to the various diffusers 24 for the rooms within the building interior. Thus, the flow of air forces the draft damper 96 to open and the warm air goes through the plenum chamber 78 and through the ducts 22 downwardly into the interior of the building, i.e. to the room space 42. When the temperature drops in the attic 12, the unit shuts down automatically.

As may be appreciated, the attic solar heating pack assembly will provide heat much more efficiently during the cool months of September, October, November, March, April and May, supplementing the primary heat supply to the building structure as otherwise provided. Thus, since there exists a 24 degree F. to 30 degree F. difference between the attic temperature and outside temperature of a building structure during the months of late November through February or about 1:00 P.M. on clear sunny days, because of the increase of the length of days and the increase of the angle of the sun rays, the unit will heat much more efficiently during the months of September, October, November, March, April, and May, and the ability of the unit to provide heating for the building structure will increase substantially for buildings within the southern states.

As may also be appreciated, the draft damper effectively closes off the plenum inlet when the blower motor is de-energized. thereby preventing heat loss from the room interior to the attic 12 via the flexible ducts 22, plenum chamber 78, and blower inlet 88. Further, dampers incorporated within the diffusers may be set to regulate the volume of air reaching a given room, that is, discharging through a given diffuser 24 into the building interior beneath the ceiling 40.

While the invention has been particularly shown and described with reference to a preferred embodiment thereof, it will be understood by those skilled in the art that various changes in form and details may be made therein without departing from the spirit and scope of the invention.

What is claimed is:

1. A compact attic solar heating pack assembly for mounting within a building attic having diagonally opposed south and north facing roof sections overlying a horizontal building attic floor forming the ceiling and defining an enclosed attic space above the occupied room space below the ceiling, said building further including vented eaves opening to the attic enclosure at the bottom thereof, said pack assembly comprising:

a closed sheet metal plenum, means for fixedly mounting said plenum within said attic just below at said apex, a blower fixedly mounted to the plenum, said blower having an air inlet open to the attic enclosure,

BEST AVAILABLE COPY said blower including a blower outlet opening to the interior of the plenum, an electric motor for driving said blower, a plurality of air outlets within said plenum, flexible ducts coupled at one end to said plenum chamber outlets, respectively, and terminating at their other ends in diffusers, said diffusers being mountable within said attic floor and opening through the ceiling for delivering air from said plenum chamber to the interior occupied rooms of the building, a first, normally open, cooling thermostat adapted for mounting within said attic enclosure adjacent said apex and responsive to a substantial increase in temperature of the air within the attic enclosure over the outside air based on direct solar radiation through said south facing attic roof section, a second, normally open, heating thermostat adapted for mounting within the interior of said building below said attic and responsive to the temperature of the interior room, cable means for electrically connecting said blower motor and said first and second thermostats in series and adapted to energize said blower motor via a source of electrical power upon closure of said normally open first and second thermostats, and a blower outlet damper at said plenum chamber inlet for automatically closing off the inlet to the blower from the building interior via said flexible duct to prevent loss of heat from the room interior back through the attic.

2. The pack assembly as claimed in claim 1, further comprising a flexible heat barrier sheet extending throughout the attic from one end to the other and hanging downwardly from the apex of the attic space towards the floor of the attic and to a position at least below the plenum chamber to separate the attic interior into a heat concentration space between the flexible heat barrier sheet and the south facing roof section, *and said blower air inlet opening to said heat concentration space.*

3. The pack assembly as claimed in claim 1, further comprising straps extending upwardly from the plenum chamber for mounting to the attic structure above the plenum chamber such that the plenum chamber is suspended from the ceiling roof at the apex of the attic.

4. In combination, a building structure and compact attic solar heating pack assembly, said building structure comprising:

vertical support walls, horizontal attic joists mounted to the upper ends of said building walls and extending therebetween, roof rafters extending upwardly from opposite sidewalls of the building structure towards each other and being inclined from the horizontal, a ridge pole connecting the upper ends of said roof rafters, roofing covering said roof rafters, and a ceiling underlying the ceiling joists to define with said vertical walls and said roofing, an essentially closed attic space, said roof rafters projecting beyond the ends of said sidewalls and open eaves formed within the roof structure to permit air to enter the attic interior space, interior vertical partition walls within said building, said solar heating pack assembly comprising:

a closed sheet metal plenum defining a plenum chamber, means for mounting said plenum within said attic space just below said ridge pole, a blower fixedly mounted to said plenum, said plenum having an air inlet and a plurality of air outlets, said blower including an air inlet opening to the attic interior and an air outlet opening directly to said plenum chamber, an electric motor for driving said blower, a blower outlet damper within said plenum chamber inlet for automatically closing off the passage from said plenum chamber to said blower upon termination of energization of the blower motor, flexible ducts coupled at one end to said plenum chamber outlets, respectively, and terminating, at their other ends, in air diffusers, holes within the building ceiling sealably receiving said diffusers, whereby air is delivered from said plenum chamber through said flexible ducts to the building interior, via said diffusers, a first, normally open, cooling thermostat mounted within said attic space adjacent said ridge pole, a second, normally open, heating thermostat mounted within the room interior on said partition wall, below said ceiling, a source of electrical power within said building interior, wires electrically connecting said blower motor and said thermostats in series and across said electrical source for energizing said blower motor through said thermostats such that said second, normally open, heating thermostat closes upon droppage in room temperature, and said first, normally open, cooling thermostat closes as a result of thermal radiation on said south facing roof section of sufficient magnitude raising the temperature of the air within said attic space to a level above that of the temperature of the room to be conditioned;

whereby, hot air from the attic space is pumped into the room interior for supplemental heating under such conditions.

5. The building structure and pack assembly as claimed in claim 4, further comprising a flexible heat barrier sheet extending across the length of the attic from one end to the other, having an upper end fixed to the bottom of said ridge pole, and a lower end extending beneath said plenum chamber to thereby function to concentrate solar induced heat between said flexible heat barrier sheet and said south facing roof section, thermally isolated from the space to the opposite side of said flexible heat barrier sheet underlying said north facing roof section, *and said blower air inlet opening to said space between said heat barrier sheet and said south facing roof section.*

6. The building structure and pack assembly as claimed in claim 4, wherein said means for mounting said plenum within said attic at said apex comprises a plurality of straps fixed at their lower ends to said plenum and at their upper ends to the rafters to opposite sides of said ridge pole.

*7. A compact attic solar heating pack assembly for mounting within a building attic having south and north facing roof sections overlying a horizontal building attic floor forming the ceiling and defining an enclosed attic space above the occupied room space below the ceiling, said pack assembly comprising:*

BEST AVAILABLE COPY

*a closed sheet metal plenum,*

*means for fixedly mounting said plenum within said attic just below at said roof,*

*a blower fixedly mounted to the plenum, said blower having an air inlet open to the attic enclosure,*

*said blower including a blower outlet opening to the interior of the plenum,*

*an electric motor for driving said blower,*

*at least one air outlet within said plenum,*

*a duct coupled at one end to said plenum chamber outlet and terminating at its other end in a diffuser, said diffuser being mountable within said attic floor and opening through the ceiling for delivering air from said plenum chamber to said occupied room space of the building,*

*a first, normally open, cooling thermostat adapted for mounting within said attic enclosure adjacent said roof and responsive to a substantial increase in temperature of the air within the attic enclosure over the outside air based on direct solar radiation through said roof,*

*a second, normally open, heating thermostat adapted for mounting within the interior of said building below said attic and responsive to the temperature of the interior room,*

*cable means for electrically connecting said blower motor and said first and second thermostats in series and adapted to energize said blower motor via a source of electrical power upon closure of said normally open first and second thermostats, and*

*a blower outlet damper at said plenum chamber inlet for automatically closing off the inlet to the blower from the building interior via said duct to prevent loss of heat from the room interior back through the attic.*

*8. The pack assembly as claimed in claim 7, further comprising a flexible heat barrier sheet extending within the attic spanning at least across the metal plenum from one end to the other and hanging vertically downwardly from the roof of the attic towards the floor of the attic and to a position at least below the plenum chamber to separate the attic interior into a heat concentration space between the flexible heat barrier sheet and the south facing roof section, and said blower air inlet opening to said heat concentration space.*

*9. In combination, a building structure and compact attic solar heating pack assembly, said building structure comprising:*

*vertical support walls,*

*horizontal attic joists mounted to the upper ends of said building walls and extending therebetween,*

*roof rafters extending from opposite sidewalls of the building structure,*

*roofing covering said roof rafters,*

*and a ceiling underlying the ceiling joists to define with said vertical walls and said roofing, an essentially closed attic space,*

*said solar heating pack assembly comprising:*

*a closed sheet metal plenum defining a plenum chamber,*

*means for mounting said plenum within said attic space just below said roof,*

*a blower fixedly mounted to said plenum,*

*said plenum having an air inlet and at least one air outlet,*

*said blower including an air inlet opening to the attic interior and an air outlet opening directly to said plenum chamber,*

*an electric motor for driving said blower,*

*a blower outlet damper within said plenum chamber inlet for automatically closing off the passage from said plenum chamber to said blower upon termination of energization of the blower motor,*

*at least one duct coupled at one end to said plenum chamber outlet and terminating at its other end in an air diffuser,*

*a hole within the building ceiling sealably receiving said diffuser, whereby air is delivered from said plenum chamber through said flexible ducts to the building interior via said diffuser,*

*a first, normally open, cooling thermostat mounted within said attic space adjacent said roof,*

*a second, normally open, heating thermostat mounted within the room interior below said ceiling,*

*a source of electrical power within said building interior,*

*wires electrically connecting said blower motor and said thermostats in series and across said electrical source for energizing said blower motor through said thermostats such that said second, normally open, heating thermostat closes upon droppage in room temperature, and said first, normally open, cooling thermostat closes as a result of thermal radiation on said roof of sufficient magnitude raising the temperature of the air within said attic space to a level above that of the temperature of the room to be conditioned;*

*whereby, hot air from the attic space is pumped into the room interior for supplemental heating under such conditions.*

*10. The building structure and pack assembly as claimed in claim 9, further comprising a flexible heat barrier sheet extending across the attic from one end to the other, having an upper end fixed to the bottom of said roof, and a lower end extending beneath said plenum chamber to thereby function to concentrate solar induced heat between said flexible heat barrier sheet and a solar radiation roof section, thermally isolated from the space to the opposite side of said flexible heat barrier sheet, and said blower air inlet opening to said space between said heat barrier sheet and said south facing roof section.*

• • • • •